March 22, 1966     A. P. VIRET ETAL     3,241,256
METHOD AND MEANS FOR INTEGRALLY LIGHTING AN INDICATOR
WITH UNIFORM BRIGHTNESS AND WITH LIGHT CONSERVATION
Filed May 13, 1963     4 Sheets-Sheet 1

INVENTORS
ANDRE P. VIRET
WOLFGANG FUHR

BY *Herbert L. Davis*
ATTORNEY

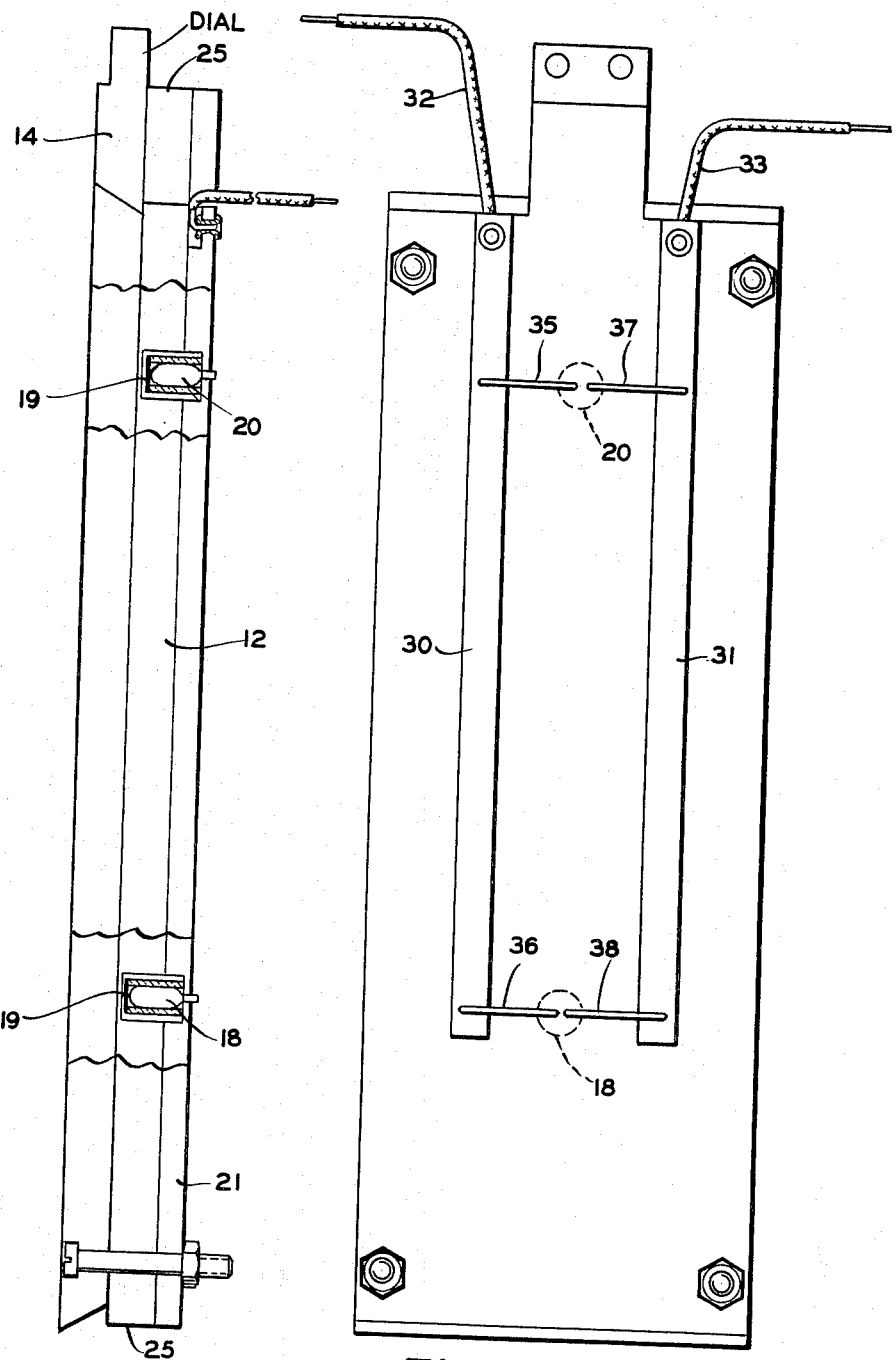

March 22, 1966 A. P. VIRET ETAL 3,241,256
METHOD AND MEANS FOR INTEGRALLY LIGHTING AN INDICATOR
WITH UNIFORM BRIGHTNESS AND WITH LIGHT CONSERVATION
Filed May 13, 1963 4 Sheets-Sheet 4
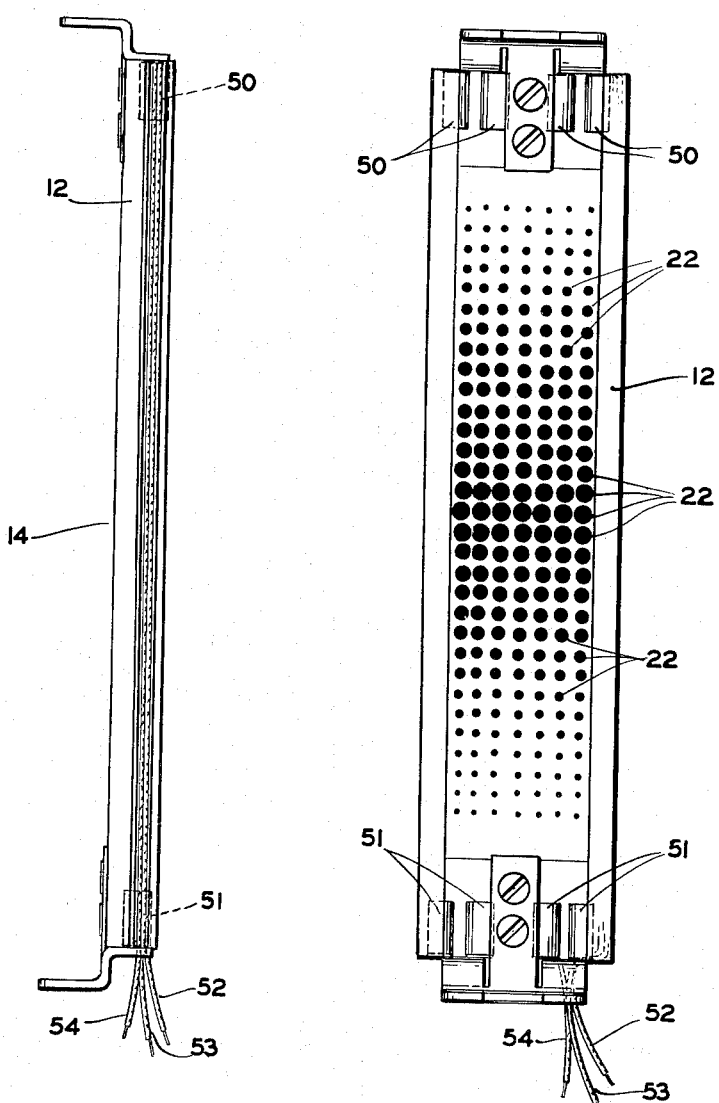
INVENTORS
ANDRE P. VIRET
WOLFGANG FUHR
BY Herbert L. Davis
ATTORNEY United States Patent Office 3,241,256
Patented Mar. 22, 1966

3,241,256
METHOD AND MEANS FOR INTEGRALLY LIGHT-
ING AN INDICATOR WITH UNIFORM BRIGHT-
NESS AND WITH LIGHT CONSERVATION
Andre P. Viret, Ridgewood, and Wolfgang Fuhr, Has-
brouck Heights, N.J., assignors to The Bendix Corpora-
tion, Teterboro, N.J., a corporation of Delaware
Filed May 13, 1963, Ser. No. 279,723
6 Claims. (Cl. 40—130)

This invention relates to a method and means for integrally lighting an indicator with uniform brightness throughout and with light conservation and more particularly to improvements in the illumination of instrument dials, scales, and indicator tapes so as to achieve light conservation and uniform brightness in a lighting system by a novel pattern of light reflecting (diffuse reflection) areas or dots, hereinafter called the "dot pattern," at appropriate locations on the back surface of a light conducting block or panel and in which "dot pattern" the dots or diffusing areas are either larger in size or more densely distributed or both, the greater the distance thereof from the light source.

One of the basic methods of integrally lighting an indicator has been to transilluminate the indicator dial. This has often been done by using a dial with translucent indicia (not necessarily white) in a black background. Behind the dial there has been placed a light conducting block in which are inserted illuminating lamps so arranged that light rays from the lamps diffuse through the block so as to emmanate from the front surface thereof (as well as from its other surfaces) so as to pass through the dial and thereby transilluminate it. This technique, while very simple, has not been found entirely satisfactory in that there has developed a considerable loss of light, and there is an undesirable nonuniform brightness distribution over the face of the dial.

Heretofore, diffusion areas of predetermined size and shape have been provided on the back surface of a light conducting block immediately opposite areas to be illuminated such as indicia in order to diffusely reflect light rays impinging on the diffusing areas up and through the indicia immediately above them. This produced more uniform illumination of the indicia. In the present invention, there is provided a novel pattern of diffusing surfaces or dots so formed upon the lower surface of the light conducting block as to diffuse the internally reflected light rays with uniform intensity from the light conducting block through a translucent dial, scale, or indicator tape situated above said block and optically separated from it in order to produce a uniform brightness of the dial, scale, or tape.

This allows a dial or scale to be uniformly illuminated throughout its surface including the background thereof as well as the indicia thereon. It also allows a tape with indicia thereon to be moved over the light conducting block with a constantly uniform illumination of the indicia and background thereof.

An object of the invention, therefore, is to provide a method and means of achieving light conservation and uniform distribution of light rays over the entire face of an indicator dial or tape by putting light reflecting (diffuse reflection) dots or areas at appropriate locations on the back of the light conducting block.

Another object of the invention is to provide such dots in a so-called dot pattern to effect a more uniform brightness distribution throughout a dial, scale, or tape (including background) by providing dots of large size and/or more dense distribution the greater the distance of the dots from the light source.

Another object of the invention is to provide a light-reflecting dot pattern on the lower side of a light conducting block, in which arrangement light rays which are not reflected off the dots the first time around are not lost since such light rays may be internally reflected off the polished surfaces of the light conducting material between the dots and off the reflective coatings on the edges of the block so as to be kept within the block until such time as they are diffused by striking a light reflecting dot.

Another object of the invention is to provide in such arrangement a novel dot pattern in which the dots act to effect diffused reflections so that the light rays reflecting off of them are so spread out that by the time they pass through the dial, scale, or tape a uniform brightness distribution is effected over the entire surface of the dial, scale, or tape, including background.

Another object of the invention is to provide in such a dot pattern dots of varying size and shape convenient to provide the desired brightness distribution and in which arrangement normally the dots are larger and more densely distributed the greater the distance thereof from the light source.

Another object of the invention is to provide from the foregoing technique a reduction in the quantity of lamps needed to effect the desired illumination by conserving the light rays through appropriate coating at peripheral edges of the light conducting block with a suitable specular reflecting material and further by preventing the formation of a bright spot which normally occurs directly above the illumination lamp by inserting some sort of light baffle immediately above the lamps.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 1 is a sectional view illustrating one embodiment of the invention wherein light rays from light sources pass through a light conducting member and may be diffused from light reflecting areas or dots of different size and variously located so as to effect a uniform distribution of the light rays through a translucent movable indicator tape and in which the dots may be of larger size and of greater density the greater the distance thereof from the source of light so as to effect the desired uniform brightness.

FIGURE 3 is a side view of FIGURE 2 with certain parts broken away to illustrate the lamps in the light conducting block.

FIGURE 4 is a rear view of FIGURE 2 showing the electrical conductors for energizing the lamps.

FIGURE 6 is an edge view of a modified form of the invention.

FIGURE 7 is an underside of the illuminating block of FIGURE 6 showing the pattern of the light reflecting areas or dots to effect the desired uniform distribution of the light rays through an indicator dial and with illuminating lamps arranged at opposite ends of the light conducting block.

FIGURE 8 is an end view of the illuminating block of FIGURE 7 with the mounting bracket removed and illustrating the arrangement of the illuminating lamps in the end of the block.

Figure 1:
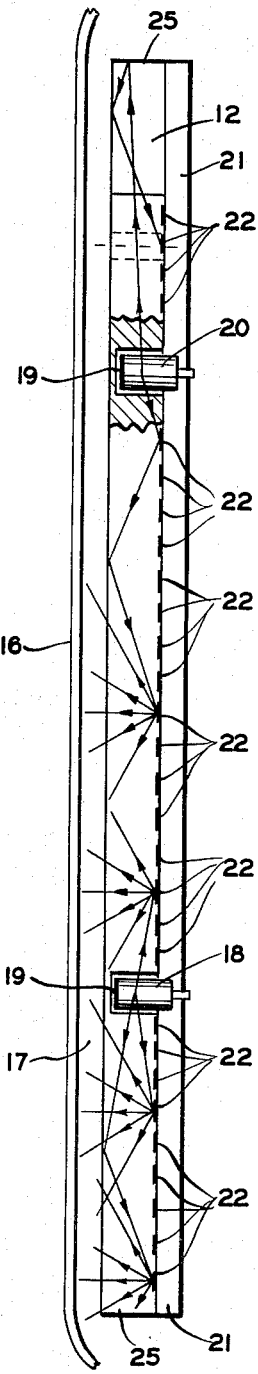

Referring now to the drawings wherein like reference characteristics designate like or corresponding parts throughout the views, there is shown in FIGURE 1 a sectional view of one form of the illuminating system comprising the invention including a light transmitting block or panel 12, a translucent tape 16 having suitable translucent indicator markings formed in a translucent black background thereon and separated by an air space 17 from the front surface of the panel 12. The tape 16 may be positioned relative to the light transmitting block or panel 12 by suitable drive means such as shown, for example, in U.S. Patent No. 3,117,312 granted January 7, 1964, by William F. Watson, for a Vertical Scale Condition Indicator, and which patent has been assigned to The Bendix Corporation, assignee of the present invention.

In the light conducting block 12, there may be provided suitable sources of light energy such as electric lamps 18 and 20 positioned in the panel 12 in spaced relation and carried by a supporting plate 21. The lamps 18 and 20 are arranged to introduce light energy in the form of light rays into the light transmitting block or panel 12 by transmission therethrough and by internal reflection from the adjacent upper and lower surfaces of the panel or block 12 and by reflection from the outer edges of the panel 12, as indicated in FIGURE 1 by the dash lines indicating the paths of internal reflection of the light trays therein.

Moreover, in order to prevent the formation of a bright spot directly in front of the lamps 18 and 20, there may be inserted a light baffle 19 in the lamp hole directly in front of the lamps 18 and 20, as shown in FIGURES 1 and 3, or in the alternative the front of the lamps or the filter over the lamps 18 and 20 may be painted black.

Further, as shown in FIGURE 1, diffusing areas 22 of predetermined size and shape are provided upon the back surface of the panel 12 for causing the light rays internally transmitted and reflected in the block 12 to be diffusely reflected through the upper surface of the light transmitting block 12 upon impinging on the area 22 so as to transilluminate the translucent indicator tape 16 with uniform brightness (that is, the indicia have uniform brightness values and the background has an equally uniform but lower brightness value).

Any ray of light within a transparent medium which encounters an air interface at the critical angle (for example, 42.2 degrees off the normal for Plexiglas) or greater will not be transmitted—but totally reflected.

When a light ray strikes a diffuse reflector (such as white paint) the reflected light distribution is independent of the angle at which the light strikes the surface. No matter what this angle may be, the maximum intensity of the light reflected is normal to the surface and the light is spread throughout an angle of one hundred and eighty degrees (180°).

Figure 5:
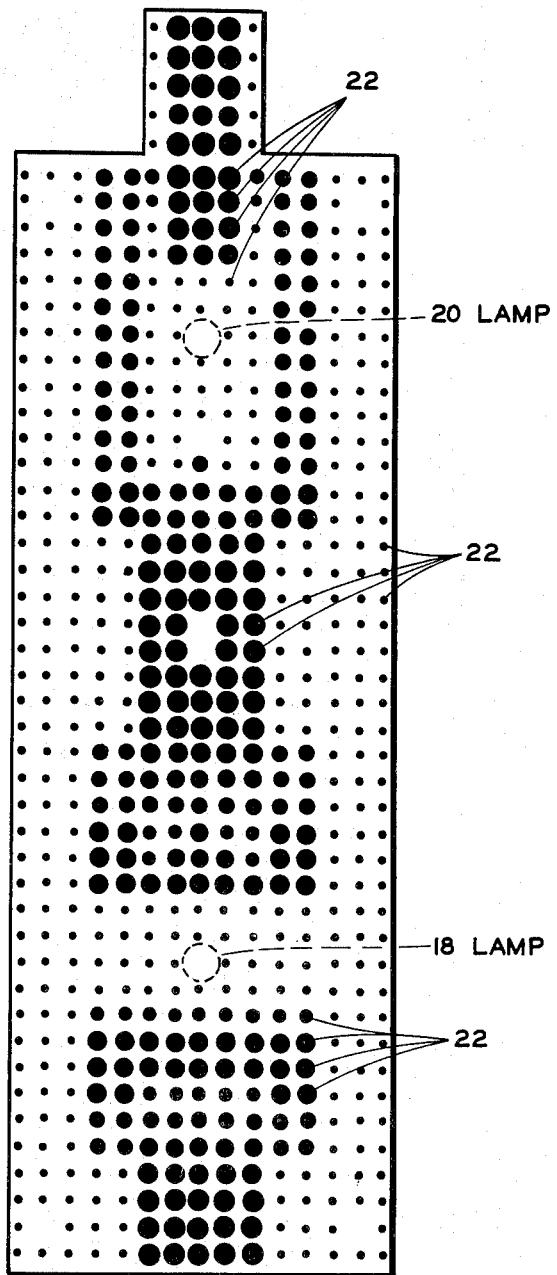
FIGURE 5 is a rear plan view of the under surface of the light conducting block of FIGURES 1 and 2 showing the novel pattern of light diffusing dots to effect the uniform distribution of the light rays through an indicator dial, as shown in FIGURE 2, or translucent tape, as shown in FIGURE 1.

The diffusing areas 22 may be of different predetermined size and shape to effect the desired illumination with uniform brightness over the entire viewable area of the translucent indicator tape 16 of FIGURE 1 or indicator dial 14 of FIGURE 3. Normally, as shown in FIGURES 5 and 7, the light diffusing dots are larger and/or more densely distributed the further away they are located from the light source in order to diffuse the light rays impinging thereon and produce a uniform transillumination of the dial or tape above the light conducting block 12.

As shown in FIGURE 1, the reflecting light rays which exceed the complement of the critical angle of the material comprising the light transmitting block 12 are transmitted from its outer surface through the air space 17 and translucent tape 16 so as to illuminate the indicia and background of tape 16 with uniform brightness over the entire viewable area of the indicator tape 16.

The diffusing block illumination system, herein described may serve to illuminate an indicator dial, tape, scale or the like by the transmission of light energy by diffuse reflection from a first light transmitting block or panel so as to illuminate with uniform brightness an indicator panel, scale, dial or translucent tape optically separated therefrom. Moreover, by the diffused reflection of the internally transmitted light rays uniform brightness in illumination may be obtained over the entire viewable surface of the indicator panel or translucent indicator tape including the background of the panel or tape.

The light transmitting block or member 12 may comprise a flat transparent plate having upper and lower surfaces in parallel relation to each other polished to provide an optically smooth and clear surface. Member 12 is of such suitable physical dimensions as to effectively transmit light energy to all portions of a juxta-positioned indicator panel 14, as in FIGURE 3, or translucent tape 16, as in FIGURE 1.

Although any clear, colorless, transparent light transmitting material may be used in forming the light transmitting member 12, the member 12 may be fabricated from an acrylic resin or methyl methacrylate plastic material of the thermoplastic type such as, for example, "Lucite" or "Plexiglas." Thermosetting materials such as the allyl resins also are applicable as in glass.

The feature of the present invention resides in the provision of the back surface of the light transmitting block 12 with a predetermined pattern of light diffusing surfaces 22 which may be formed in the back surface of the light transmitting block 12 by etching with an engraving tool or the like or by photoetching or by applying a dot coating or translucent or opaque material, such as paint, directly to the surface. The dot coatings may be applied by the silk screen, paint spray process, or any other suitable process in which the dot coatings of paint are applied in optical contact with the light transmitting element.

Further, the peripheral edges 25 of the light conducting block 12 may be coated with specular reflecting material (such as silver or aluminum) for maximum conservation of light. Diffused reflector material such as white paint may also be used, but this has been found to be not as effective a light conserver as materials such as silver or aluminum. In the alternative, the peripheral edges 25 may be left clear if light conservation is unimportant.

Figure 2:
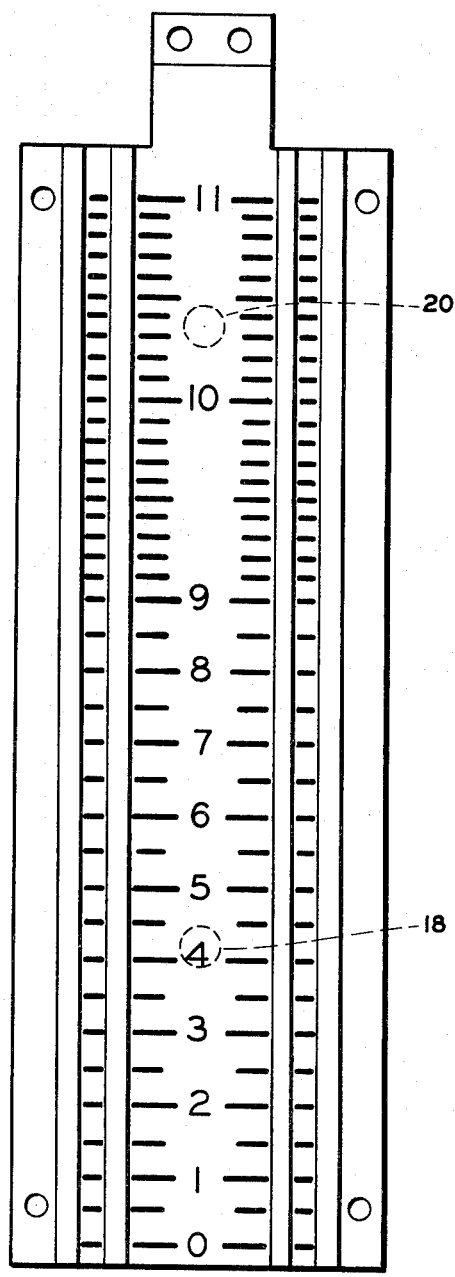
FIGURE 2 is a front plan view of a modified form of the invention as applied to an indicator dial.

Moreover, since the dots or areas 22 are diffused reflectors, the light rays reflected off them spread out as such rays pass through the block 12 and indicator dial 14 of FIGURES 2 and 3 or translucent indicator tape 16 of FIGURE 1 so that the dot pattern is not reproduced as such on the dial or indicator tape. The dots may be any size or shape necessary or convenient to produce the desired distribution of the light rays with uniform brightness.

A second form of the invention is illustrated in FIGURES 2, 3, 4 and 5 wherein like numerals indicate corresponding parts to those described with reference to FIGURE 1.

Moreover, as shown in FIGURE 3, there is positioned adjacent the front surface of the light conducting block or panel 12 a light diffusing or transmitting panel 14 having on the front face thereof suitable indicator markings, as shown in FIGURE 2.

In the drawing of FIGURE 4, there are shown electrical conductor bars 30 and 31 connected to sources of electrical energy through conductors 32 and 33, respectively. The conductor bar 30 includes conductors 35 and 36 while the conductor bar 31 includes conductors 37 and 38 which lead respectively to the input terminals of the electric lamps 18 and 20 so as to provide electrical energy for the illumination of the respective lamps 18 and 20 mounted in the light conducting block 12 of FIGURE 3 and providing sources of illumination thereof.

In FIGURES 6 and 7, there is illustrated a further modified form of the invention in which corresponding parts to those described with reference to FIGURE 1 have been indicated by corresponding numerals.

In the form of the invention of FIGURES 6 and 7, the sources of light rays for illuminating the light conducting block 12 are electric lamps 50 and 51 mounted at opposite ends of the light conducting block 12. These lamps may be electrically connected to a suitable source of electrical energy through conductors 52, 53, and 54. Further, as shown in FIGURE 7, there is provided at the under or back side of the light conducting block 12 a pattern of light diffusing areas or dots 22 in which dots 22 of larger size are arranged in the central area and at a greater distance from the lamps 50 and 51 mounted at opposite ends of the light conducting block 12. These light diffusing areas or dots diminish in size as the same approach the outer ends of the block 12 so as to effect the desired uniform diffusion or distribution of the light rays through the light diffusing panel, indicator dial or indicia bearing surface 14.

While several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an illumination system of a type including a light conducting block of transparent material having substantially parallel front and rear reflecting surfaces, said surfaces being polished and operative to specularly reflect light rays in said block, a member of translucent material extending parallel to said surfaces and positioned adjacent to the front face of said light conducting block, and said member of translucent material having indicia in an obverse face thereof; the improvement comprising a light diffusing means in optical contact with the rear reflecting surface of the light conducting block, said light diffusing means including light diffusing areas of different size arranged in spaced relation in a predetermined pattern in such a manner as to diffuse a portion of said specularly reflected light rays from the rear surfaces of the block of light conductor material into and through the member of translucent material so as to illuminate the entire viewable surface area of the member of translucent material with uniform brightness, said light diffusing means includes a series of paint dots arranged in a predetermined pattern, said dots being of different size and having a different spaced relation so as to effect a diffusion of the light rays through the translucent member with uniform brightness.

2. In an illumination system of a type including a light conducting block of transparent material having substantially parallel front and rear reflecting surfaces, said surfaces being polished and operative to specularly reflect light rays in said block, a member of translucent material extending parallel to said surfaces and positioned adjacent to the front face of said light conducting block, and said member of translucent material having indicia in an obverse face thereof; the improvement comprising a light diffusing means in optical contact with the rear reflecting surface of the light conducting block, said light diffusing means including light diffusing areas of different size arranged in spaced relation in a predetermined pattern in such a manner as to diffuse a portion of said specularly reflected light rays from the rear surface of the block of light conductor material into and through the member of translucent material so as to illuminate the entire viewable surface area of the member of translucent material with uniform brightness, the light diffusing means includes a plurality of light diffusing reflecting dots placed in optical contact with the rear polished surface of the block of light conducting material and in a predetermined patern so as to provide the dots of a larger size and more dense distribution, the gerater the distance thereof from the light source.

3. In a diffusing block illumination system of a type including means for illuminating an indicia bearing surface comprising a transparent light transmitting block having plane, polished, and parallel front and rear reflecting surfaces for specularly reflecting light rays introduced therein from a light source; the improvement comprising a predetermined pattern of light diffusing elements positioned on the rear surface of said light transmitting block, said pattern including a plurality of said elements of different size arranged in different spaced relation, and said pattern being such that a portion of the light rays specularly reflected in said light transmitting block may be diffusely reflected by said diffusing elements from the rear reflecting surface of the light transmitting block into and through the indicia bearing surface so as to illuminate the last-mentioned surface with uniform brightness, said light diffusing elements include a series of paint dots arranged in a predetermined pattern, said dots being of different size and having different spaced relation so as to effect diffusion of the light rays through the indicia bearing surface with said uniform brightness.

4. In a diffusing block illumination system of a type including means for illuminating an indicia bearing surface comprising a transparent light transmitting block having plane, polished, and parallel front and rear reflecting surfaces for specularly reflecting light rays introduced therein from a light source; the improvement comprising a predetermined pattern of light diffusing elements positioned on the rear surface of said light transmitting block, said pattern including a plurality of said elements of different size arranged in different spaced relation, and said pattern being such that a portion of the light rays specularly reflected in said light transmitting block may be diffusely reflected by said diffusing elements from the rear reflecting surface of the light transmitting block into and through the indicia bearing surface so as to illuminate the last-mentioned surface with uniform brightness, the light diffusing elements include a plurality of light diffusing reflection dots placed in optical contact with the rear polished surface of the block of a light conducting material and in a predetermined pattern in which the dots are of a larger size and more densely distributed, the greater the distance thereof from the light source.

5. Means for illuminating a translucent indicia bearing surface, said means comprising a light conducting block of transparent material having opposite ends and substantially front and rear reflecting surfaces, said front and rear surfaces being operative to specularly reflect light rays in said block, said front and rear surfaces being substantially parallel to said translucent indicia bearing surface, sources of light rays mounted at the opposite ends of said light conducting block, light diffusing means in optical contact with the rear reflecting surface of the light conducting block, said light diffusing means including light diffusing areas of different size and spaced relation in a predetermined pattern in which light diffusing areas of relatively greater size may be located intermediate the sources of light rays, and in which light diffusing areas of relatively lesser size are located nearer the source of light rays at one of said ends and in greater spaced relation to the other of said light diffusing areas than the light diffusing areas of said relatively greater size, and said predetermined pattern of light diffusing areas being so arranged in such a manner as to diffuse a portion of said specularly reflected light rays from the rear surface of the light conducting block into and through the translucent indicia bearing surface so as to uniformly illuminate the last-mentioned surface.

6. In a diffusing block illumination system of a type including means for illuminating an indicia bearing surface comprising a transparent light transmitting block having plane, polished, and parallel front and rear reflecting surfaces for specularly reflecting light rays introduced therein from a light source; the improvement comprising a predetermined pattern of light diffusing elements positioned on the rear surface of said light transmitting block, said pattern including a plurality of said elements of different size arranged in different spaced relation, and said pattern being such that a portion of the light rays specularly reflected in said light transmitting block may be diffusely reflected by said diffusing elements from the rear reflecting surface of the light transmitting block into and through the indicia bearing surface so as to illuminate the last-mentioned surface with uniform brightness, the light diffusing elements include a plurality of light diffusing reflection dots placed in optical contact with the rear polished surface of the light transmitting block and in a predetermined pattern in which the dots are of a larger size and more densely distributed, the greater the distance thereof from the light source, and in which said indicia bearing surface may be of a movable translucent indicator tape operable for receiving the uniform diffused light therethrough so as to be illuminated with uniform brightness.

References Cited by the Examiner
UNITED STATES PATENTS

| | | | |
|---|---|---|---|
| 2,561,885 | 7/1951 | Prideaux | 40—130 |
| 2,629,043 | 2/1953 | Holtje | 40—130 X |
| 2,824,399 | 2/1958 | Neugass | 40—130 |
| 2,880,536 | 4/1959 | Sullivan | 40—130 |
| 2,945,313 | 7/1960 | Hardesty | 40—130 |
| 3,043,038 | 7/1962 | Marble | 40—130 |
| 3,043,947 | 7/1962 | Albinger | 40—130 X |

EUGENE R. CAPOZIO, *Primary Examiner.*

JEROME SCHNALL, *Examiner.*